Jan. 8, 1963
R. A. GELERT
3,072,230
SCREEN WALL CONSTRUCTION
Filed June 20, 1960
3 Sheets-Sheet 1
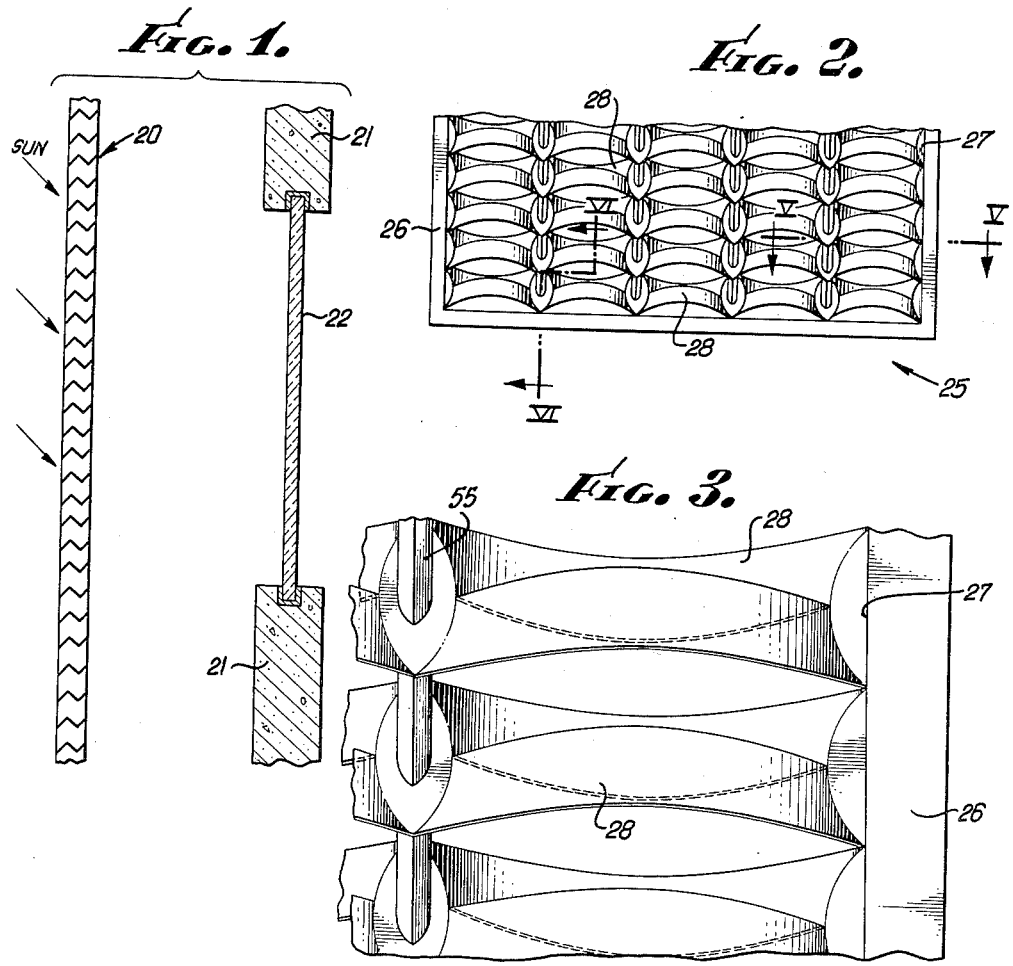
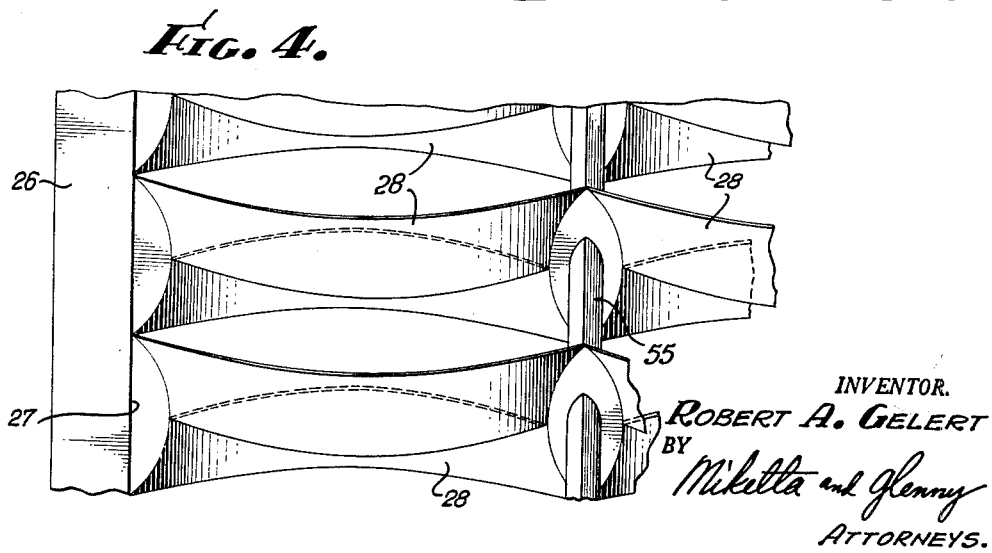
INVENTOR.
ROBERT A. GELERT
BY
Miketta and Glenny
ATTORNEYS.

Jan. 8, 1963 R. A. GELERT 3,072,230
SCREEN WALL CONSTRUCTION
Filed June 20, 1960 3 Sheets-Sheet 2
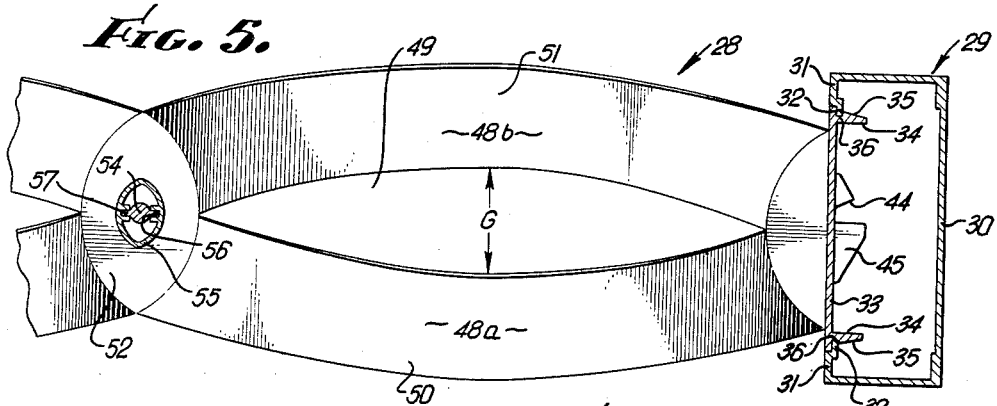
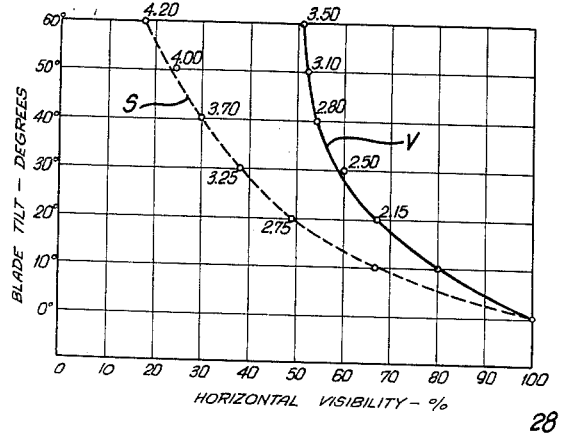
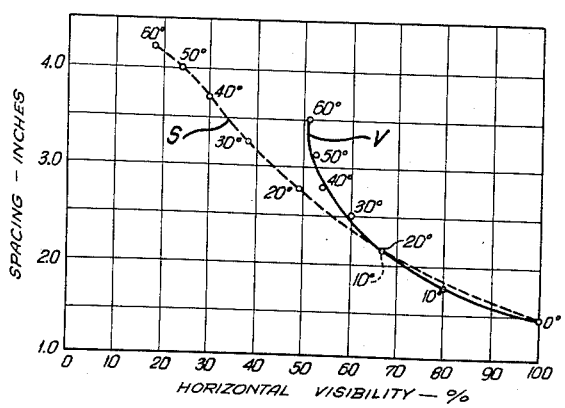
INVENTOR.
ROBERT A. GELERT
BY
Niketta and Glenny
ATTORNEYS.

Jan. 8, 1963
R. A. GELERT
3,072,230
SCREEN WALL CONSTRUCTION
Filed June 20, 1960
3 Sheets-Sheet 3
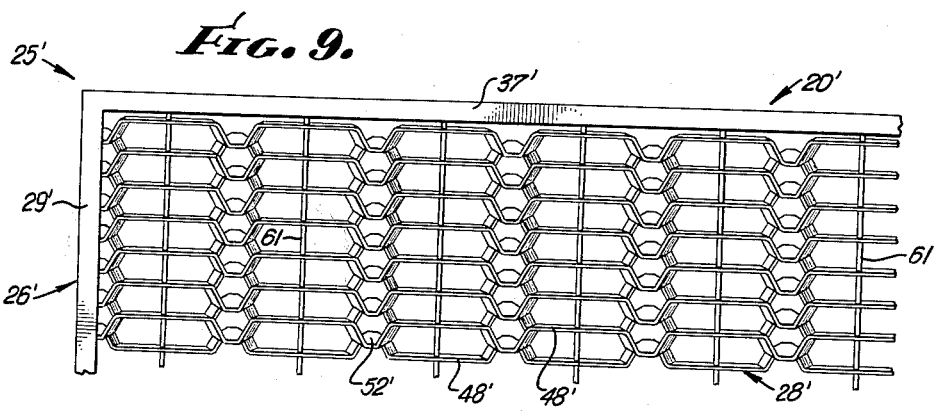
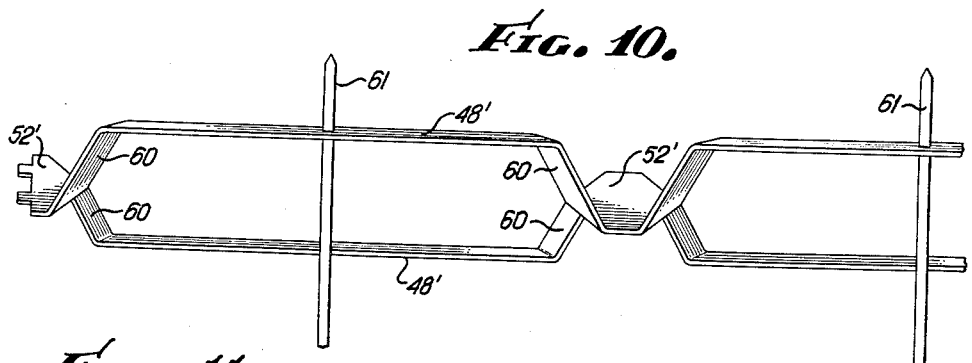
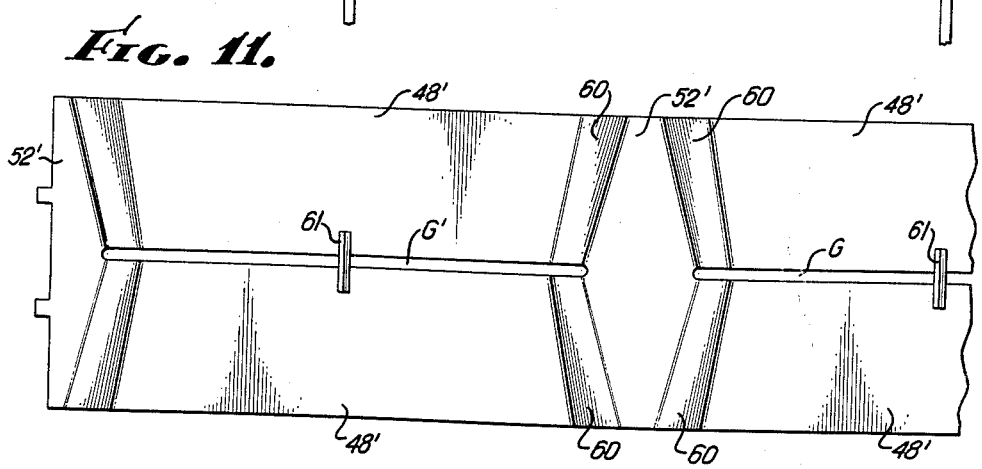
INVENTOR.
ROBERT A. GELERT
BY
*Miketta and Glenny*
ATTORNEYS.

3,072,230
Patented Jan. 8, 1963

3,072,230
SCREEN WALL CONSTRUCTION
Robert A. Gelert, Fullerton, Calif., assignor, by mesne assignments, to Northrop Architectural Systems, a corporation of California
Filed June 20, 1960, Ser. No. 37,236
9 Claims. (Cl. 189—82)

This invention relates to a novel solar energy control screen wall construction having a three-dimensional sculpturesque effect and affording full shade from the sun to a selected angle while providing maximum visibility through said wall construction from the shaded side thereof. The invention more particularly relates to a sun screen wall construction adapted to be associated with an exterior building wall in order to virtually fully shade said exterior wall while at the same time permitting maximum horizontal visibility from the building wall through the sun screen wall construction.

The present invention has particular utility with respect to office buildings, industrial buildings and residential buildings wherein the exterior building wall is provided with windows or other large openings for admission of light to the interior of the building. The effect of direct sunlight on the transmission of heat and light through such building wall constructions, such as curtainwall and walls having extensive glass areas and window openings, has presented many problems. Direct sunlight on large glass areas and the resulting increase in solar heat transmission have greatly expanded the need for and the capacity of air-conditioning units for such buildings. It has been found that with unshaded glass or with shade thereof up to fifty percent of full shade, a tripling of transparent or open area in a wall approximately doubles the cooling load of air-conditioning units (Building Magazine, June 1958). Thus, a reduction of solar heat loads on modern building walls would reduce substantially requirements for air-conditioning equipment and under some climatic conditions may virtually eliminate air-conditioning needs except for ventilation purposes.

Direct sunlight also produces many problems of glare, brightness, light reflection, eye fatigue and discomfort. Large openings admitting such light may often be objectionable because of loss of privacy, although at the same time such openings are greatly desired to create a feeling of spaciousness. Thus direct sunlight is generally to be avoided but maximum use of sunlight in diffused form is desired for illumination of the interior of a building. Prior proposed exterior and interior shade means have only partially solved such problems. Prior proposed interior shading means which fully blocked the sun's rays usually darkened the room to such an extent that normal working conditions were affected and an atmosphere of closeness and depression was created thereby. Such interior shading means also tended to reduce circulation of air through such window openings.

Exterior means for shading such large window openings have included various types of louvres or auxiliary wall structures supported in spaced relation to the exterior building wall. Such prior proposed exterior shading means have included self-supporting masonry walls made with various patterns and designs of openings therethrough. Such masonry walls are relatively thick, heavy, and require special reinforcements if said walls are to be extended above the first floor, and are not adapted to multi-story buildings. Other prior proposed exterior shading means have included various arrangements of metal or wood constructions. Such prior constructions have included louvres which have been pre-set at an angle so that as the rays of the sun change their angle during the day relative to the wall, full or partial shade is provided. Such prior proposed exterior shading means usually do not afford full shade except under limited conditions and for only a small portion of the day. When full shade is achieved by such prior constructions visibility from the exterior building wall through the exterior shading means is substantially and considerably blocked or obstructed.

Such prior proposed exterior shading means had several disadvantages, some of which include heavy, self-supporting auxiliary wall structures which were expensive and required special reinforcement, metal exterior wall structures which may be supported from the building but which were fixed so that full shading effect was usually accompanied by obstruction of horizontal visibility therethrough over a large area, and in some instances the surfaces of the auxiliary wall collected dirt and became streaked so that the appearance of the auxiliary wall, whether viewed from outside or from the inside of the building, became unattractive and depressing. Accumulation of foreign particles on such prior proposed metal exterior shade walls collected and retained moisture, thereby aiding corrision and pitting of metal parts. It should be noted that exterior shade means are permanent structures and should remain in good condition for substantially the life of the building with which they are associated, and maintenance thereof should be at a minimum.

Such prior proposed auxiliary wall structures also created a fire problem because direct impact of a stream of water from a fire hose could not be made upon the exterior building wall, such auxiliary shade wall blocking and dispersing the stream of water.

The present invention contemplates a novel screen wall construction which obviates the disadvantages of the prior proposed exterior shade wall structures and which provides an efficient, effective shade means without noticeable, uncomfortable or objectionable impairment of horizontal visibility through the screen wall construction from the exterior building wall toward and through the sun screen wall construction.

An important object of this invention is to disclose and provide a sun screen wall construction which is so designed and constructed that a maximum of shade and a maximum of visibility is afforded by a sun screen wall construction made with a minimum of metal material.

Another object of this invention is to disclose and provide a sun screen wall construction which will afford full shade through selected angles of the sun's rays upon the wall construction while at the same time affording maximum horizontal visibility through said wall construction.

Another object of this invention is to disclose and provide a sun screen wall construction which is rigid, light-weight, structurally strong, and yet readily partially destructible to facilitate fighting a fire in the building with which the wall construction is associated.

A further object of this invention is to disclose and provide a sun screen wall construction wherein a plurality of screen members are so arranged that their surfaces are virtually self cleaning and wherein the surfaces observed from the exterior building wall with which the sun screen wall construction is associated do not collect or retain dust, dirt or other foreign particles which would detract from the appearance of the sun screen wall construction as normally observed.

A more specific object of this invention is to disclose and provide a sun screen wall construction wherein means are provided for blocking the sun's rays directed against said wall construction and wherein such blocking means include separated shade elements arranged in depth.

A still further object of this invention is to disclose and provide a screen wall construction comprising a plurality of sets of elongated screen elements arranged in spaced relation, the screen elements of each set being spaced horizontally and inclined at a selected angle.

Still another object of the invention is to disclose a screen wall construction wherein fabrication of sets or cells of separated shade elements is facilitated and wherein changes or modifications in tooling or fabricating such shade elements is reduced to a minimum and whereby such tooling may be used for varying the length of the sets of shade elements for accommodating whole units or whole numbers of sets to building constructions of different width and length.

A further object of the invention is to disclose a screen wall construction which includes as an inherent part of the design of the screen members means for compensating for expansion and contraction of the material of the screen members.

Generally speaking, the present invention comprises a sunscreen wall construction which may serve as an auxiliary wall construction to be supported in spaced relation to a fixed, permanent, exterior, single or multi-story building wall. The sun screen wall construction may comprise a plurality of thin metal screen members in parallel rows and disposed in a vertical wall zone. Each screen member may include at least two longitudinally extending, laterally separated, pre-formed portions, the separated pre-formed portions being symmetrical with respect to a lateral neutral plane defined by the screen member and also with respect to a plane normal to said lateral plane. The plurality of screen members so arranged thus provide an efficient, effective, light-weight relatively narrow sun screen wall zone which utilizes a minimum of material and yet affords full shade or blocking of the sun's rays while permitting maximum horizontal visibility therethrough from the shaded side of the wall construction.

Many other objects and advantages of this invention will be readily apparent from the following description of the drawings, in which exemplary embodiments of this invention are shown.

In the drawings:

FIG. 1 is a vertical sectional view through a building wall and a sun screen wall embodying this invention and showing the relation of the sun screen wall to the building wall;

FIG. 2 is a front elevational view of the sun screen wall shown in FIG. 1;

FIG. 3 is an enlarged front elevational view of a portion of the wall shown in FIG. 2;

FIG. 4 is a back view of FIG. 3;

FIG. 5 is a horizontal sectional view taken in the plane indicated by line V—V of FIG. 2;

FIG. 6 is a vertical sectional view taken in the plane indicated by line VI—VI of FIG. 2;

FIG. 7 is a chart comparing horizontal visibility characteristics of a single plane blade screen and a screen wall of FIG. 1 in relation to angle of blade tilt;

FIG. 8 is a chart similar to FIG. 7 and showing horizontal visibility in relation to spacing of blades;

FIG. 9 is a fragmentary front elevational view of a screen wall embodying a different modification of this invention;

FIG. 10 is an enlarged fragmentary front view of the screen wall shown in FIG. 9; and FIG. 11 is a horizontal sectional view taken of FIG. 9.

Referring to FIG. 1, a sun screen wall construction embodying this invention is generally indicated at 20 and is shown in spaced relation (for example, two to five feet) to an exterior permanent building wall 21 having an opening 22. It is understood that wall 21 may face any direction although for geographical areas in the United States, east, west and south exposures may be considered as those which present the problems to which the present invention is directed more acutely and for longer periods of time.

Means for supporting the screen wall 20 in such spaced relation are not shown since such support means do not form part of the present invention. It will be understood that such support means may comprise separate permanent footings for wall 20, extended structural members of the building wall, or suitable structural beams attached to the building wall and designed to support and to be attached to the sun screen wall in well known manner.

The screen wall 20 may be made of one or more panel units 25, depending upon the width and height of the building wall area to be covered or protected from the direct rays of the sun. Such an exemplary panel unit may comprise a suitable frame means 26 providing a frame opening 27 for a plurality of parallel screen members, blades or elements 28 arranged in rows in selected spaced vertical relation. The frame means 26 may include side frame members 29 of rectangular box section, each including an extruded inwardly facing U-section member 30 having inturned inwardly disposed lips 31 having a rabbeted edge 32. An inner plate 33 extends between and is seated on the rabbeted edges 32. Means for fastening the inner plate 33 to the lips 31 may comprise fastening lugs 34 projecting from one surface of plate 33 adjacent longitudinal edges thereof and provided with a cam edge 35 defining a lock notch 36. When the inner plate 33 is connected with the screen members 28, as later described, the U-section member 30 may be pressed into tight seating relation with plate 33 with lips 31 and cam edges 35 serving to spring the metal of rabbeted edges 32 and of lugs 34 until the rabbeted edge is snapped into notches 36 in interlocking relation therewith.

Top and bottom frame members 37 may also be of rectangular box section and formed in a manner similar to the side frame members except that U-section member 38 faces outwardly and plate 39 corresponding to plate 33 is on the outer face of member 37. Means for locking plate 39 to member 38 are similar to those above described and include notched lugs 40 having cam edges 41 and recesses 42 for interlocking engagement with the rabbeted edge 43 of the lips on the member 38.

The frame members 29 and 37 may be interconnected at their ends in any suitable manner and may be made of a lightweight material such as an aluminum alloy, and may include other suitable materials such as wood, plastic, steel and the like. The frame members define a vertical wall zone, in this example about four inches in depth and thus quite narrow with respect to its dimensions in width and height which may correspond to the width and height of an exterior building wall or a selected portion thereof to be shaded.

The plurality of screen members 28 are constructed and arranged to provide full and complete blocking of rays of the sun to a selected sun profile angle with respect to horizontal while at the same time providing maximum horizontal visibility therethrough from the side of the screen wall opposite to the direction of the sun's rays. In other words, the plurality of screen members 28 may be positioned to completely block and reflect the sun's rays from its zenith to a selected profile angle such as 20° from horizontal and while the sun is moving from the zenith to 20° (or vice-versa) the screen members do not permit passage therethrough of a direct sun ray.

The screen members 28, in this example, are of thin metal section of uniform width such as four inches, and may be made of a lightweight metal material such as aluminum alloy, or similar to the material of which the frame means is made. Each screen member extends between and is connected to the inner plates 33 of the side frame members by means of aligned slots in plates 33, each inclined at a selected angle and through which extend split end projections 44, portions 45 of each split projection 44 being bent over in opposite directions to hold the screen member in assembly with the plates 33. This means for securing each member to inner plates 33 provides advantages in assembly and disassembly and under conditions such as fire when it is desired to rapidly remove a section of the screen members, as described later.

Each screen member 28 may include one set (cell) or a plurality of sets of laterally separated longitudinally extending preformed front and back screen portions 48a, 48b arranged in depth and disposed in a direction away from the sun's rays. Each screen member 28 may be formed from a strip of metal of uniform width in which longitudinally spaced and longitudinally extending cuts or slots 49 are provided. The separated portions 48a, 48b defined by the slots may then be deformed as by stamping or pressing into a selected shape or configuration, in this example, of arcuate form. The front separated portion 48a presents a convex top face 50 facing the sun's rays, and the rear separated portion 48b presents a concave face 51 directed toward the sun. In the interval between longitudinally separated sets of screen portions an oval shaped planar section 52 may be formed with its major axis extending from front to back, said planar section defining a lateral neutral plane L of the screen member. The oppositely deformed separated portions 48a, 48b define a central gap G of elongated oval form defined by the inner edge of front portion 48a and the leading edge of back portion 48b, said edges lying in a planar zone normal to the said lateral neutral plane.

It will be apparent that each set of separated screen portions 48a, 48b so configured and shaped is symmetrical with respect to the lateral neutral plane and is likewise symmetrical with respect to the planar zone normal to said lateral plane and defined by the opposed edges of front and back portions 48a, 48b. The lateral neutral plane of each screen member is set at a preselected angle of inclination with respect to the horizontal in accordance with a predetermined profile angle at which the sun's rays will be first permitted to pass through the screen wall.

Means for holding the screen members in selected spaced relation throughout their lengths may comprise aligned ports in vertically aligned oval sections 52 through which may extend a vertically disposed rod 54 secured at opposite ends in the top and bottom frame members respectively. Tubular-like spacer members 55 of corresponding oval section extend between adjacent screen members and may have opposite ends cut at a bias to correspond to the angle of inclination of the screen members. Each spacer member 55 may include oppositely facing internal grooves 56 adapted to be longitudinally engaged with diametrically opposite external ribs 57 provided on rod 54 whereby each spacer member 55 is held on said rod in selected position and between adjacent screen members with its major axis in alignment with the major axis of the oval section 52 of the screen member.

The width of the screen members 28, the vertical spacing thereof, the selected configuration of each set or cell of separated portions 48a, 48b and, in the example, the angle of inclination of the screen members to horizontal, all function to provide an arrangement whereby full shade and maximum horizontal visibility from interior to exterior is achieved with employment of a minimum of shade material and of a wall having relatively narrow depth. It is important to note that the front and back separated portions 48a, 48b provide a sculpturesque three-dimensional variation of construction which permits the screen members 28 to be vertically spaced apart a distance greater than would be expected while achieving desired horizontal visibility and full shade. In the example illustrated where the angle of inclination of the screen members is shown at about 50°, the sun's rays directed toward said screen members will be first completely blocked by the convex faces 50 of the front screen portions 48a. As the angle of the sun's rays declines complete blocking of the sun's rays will be effected until a ray passing the leading front edge of front portion 48a is intercepted and blocked by the leading edge margin of the back portion 48b of the next adjacent screen member 28 therebelow. As the angle of the sun's rays becomes less it continues to be blocked by such back portion 48b until it passes below the leading edge of a front portion 48a and above the trailing edge of the back portion 48b of the next below adjacent screen member. The drawings show the angle of the sun at this position as approximately 20°. Thus, full blocking of direct rays of the sun is afforded throughout substantially the entire day and particularly during the period of the day when the impact of the sun's rays is greatest, that is, about midafternoon.

While the sun's rays are virtually completely blocked by the above described arrangement of screen members 28, horizontal visibility through said screen wall from the interior to the exterior thereof is at least greater than 50% of full visibility and depending upon the angle of inclination and spacing of the members, may amount to as much as 80% to 90% while still performing a full shading function. Gaps G between separated portions 48a, 48b and the spacing of members 28 tend to make the screen wall appear as a very open structure when viewed from the shaded side or interior. From the back side of the screen wall, the curved separated portions 48a, 48b tend to overlap one another with respect to a horizontal line of sight and such appearance of overlapping increases as the line of sight is inclined downwardly. Thus, the effect on an observer is that the screen wall of this invention is of relatively open structure and a subjective feeling of claustrophobia, closeness or of being shut in is in most instances not produced in a normal observer.

The results of a comparative study through corresponding portions of a screen wall constructed according to the present invention and a screen having single planar blades or louvres in vertical spaced relation is shown in the charts of FIGS. 7 and 8 and illustrate increased horizontal visibility achieved by constructions embodying the present invention. The curves are based upon the following constants: full shade to a 20° sun profile angle, and a screen member four inches in width. Variables which contribute to the achievement of maximum horizontal visibility through the screen wall are: angle of tilt of the screen member, the optimum size of gap G for each angle of tilt, and the spacing of the screen members under such an angle of gap. With respect to FIG. 7, a comparison of horizontal visibility with respect to angle of tilt is shown. Dotted line S is used for the single blade screen and solid line V is used for the screen wall of this invention. At 10° of tilt a single blade of four-inch width will achieve approximately 67% horizontal visibility. At the same degree of tilt, that is, 10°, the screen wall of the present invention achieves approximately 80° of horizontal visibility, a difference of approximately 13% and an improvement of 20%. Of particular interest is the manner in which the degree of tilt effects horizontal visibility at angles from 40° to 60°. In the case of the single blade at 40°, horizontal visibility is 30%; at 50°: 23½% visibility, and at 60°: 18% visibility. The screen wall of the present invention provides at 40° of tilt a horizontal visibility of 54%; at 50°: 52% visibility, and at 60°: 51% visibility. Thus, at a tilt of 50° there appears to be almost 120% increase in visibility between the single blade arrangement and the screen wall of this invention. On the basis of horizontal visibility, 52% visibility is achieved by the single blade construction with a blade tilt of approximately 18½° and spacing apart of the blades about 2.6″. To achieve the same degree of horizontal visibility the screen wall of the present invention would require screen members to be spaced at 3.5″ and set at an angle of about 60°. A small variation in the angle of tilt of the screen members 28, as between 40° to 60°, would only make a change of 3% in horizontal visibility while spacing of the screen members would increase from 2.8″ to 3.5″ for an increase of 25% in spacing of the screen members.

A similar result may be seen from the curves shown in FIG. 8 in which the spacing in inches is compared to horizontal visibility. To achieve a horizontal visibility of 60% the screen members 28 would require spacing of 2½" and a blade tilt of 30°. The single blade construction would require a spacing of 2.3" and an angle of tilt of about 12°. It may be noted that as horizontal visibility approaches 50% the curve V representing the screen wall of this invention rises rapidly and the spacing between curves S and V rapidly increases; such spacing representing the increase of spacing afforded between the members 28 of the present invention and the single blade structure. Thus, these curves illustrate that the sets of screen members 28 as constructed and arranged increase horizontal visibility through increased angle of tilt under conditions which afford greater spacing apart of the members and use of less material because of the increase in spacing.

In the above example, it should be noted that the convex and concave curvatures of the separated portions 48a, 48b not only serve their primary function of providing full shade to a sun profile angle of 20° but also serve to block light beams approaching the front of the screen wall from a lateral or sidewise direction. Thus, the arcuate forms of portions 48a, 48b serve to block light when the sun is at an angle other than perpendicular to the plane of the screen wall.

Another example of a screen wall construction 20' embodying this invention is shown in FIG. 9. Prime signs will be used with like reference numerals to indicate like parts described in the prior embodiment. A screen member 28' may comprise a plurality of longitudinally spaced sets or cells of laterally separated front and back portions 48'. In this example, each of the portions 48' is planar, of uniform width, and lies in a plane parallel to and in spaced relation with respect to a lateral neutral plane defined by a polygonal section 52'. Interconnecting ends of front and back separated portions 48' and sections 52' are front and back inclined sections 60 disposed in angular relation to the neutral lateral plane and also to a plane normal to said lateral plane. It will be noted that the separated portions 48' and the sections 60 are in symmetry as in the prior example. Means for spacing the screen members 28' apart may include spacer rods 61 extending through the gap G' provided between the separated portions and connected to the planar portions 48' at the central portion of each set of portions 48' for spacing the screen members 28' apart.

The screen wall 20' provides a different appearance and aesthetic effect than the prior embodiment of the invention and will afford full shade with a maximum of horizontal visibility therethrough upon selecting a desired sun profile angle, and desired spacing apart of the screen members.

It will be readily apparent to those skilled in the art that screen portions 48a, 48b embodying this invention may be made of various shapes and configurations and may be symmetrical or asymmetrical. In some instances, front separate portions may be made of one shape while back portions of the same set may be formed in another shape and the two shapes so coact and cooperate with each other as to provide desired shade conditions at a selected angle of tilt and desired visibility therethrough. The separated portions may not be uniform in width as shown but each separated portion may be formed or configured in a lateral direction to achieve a desired result. It will also be readily apparent that the sets of separate members may be interconnected in various manners and that the length of each set of separate portions may be increased or decreased depending upon the aesthetic effect desired to be created, all while providing a maximum of horizontal visibility through the screen wall while fully blocking the sun's rays to a selected sun profile angle.

It will be understood that the width of the shade elements in the front rows and the width of the shale elements in the back rows may be so varied and configured that the shade elements may not be tilted or inclined in order to produce a desired shading effect. In such instances horizontal visibility through the screen wall will be maximum while still affording certain desired shade conditions.

It will be noted that the surfaces of the screen members may be treated with selected coatings or finishes to enhance the reflection or shunning of direct sunlight and the arrangement of front and back shade elements may be such that a selected amount of light is deflected to another shade element whereby the composite effect of light as viewed from the interior side of the screen is that of soft pleasant diffused light which serves the purpose of providing desired illumination of the interior of the building with natural light.

As described hereinabove, each screen member or blade which may comprise one or more sets or cells of longitudinally spaced front and back separated shade elements may be conveniently fabricated so that the whole number of cells or sets of units are provided in a length of screen member selected to correspond to the width of wall or wall portion with which the screen wall is to be associated. This may be readily accomplished by varying the length of the gap, slot or cut made in the strip and such variation in length may be conveniently made by the same tooling. Similarly, forming the front and back shade elements may be readily accomplished under such varying dimensions. It has been found that the same tooling may be used for widths of wall areas to be covered on units up to fifty feet, for example, so that a whole number of cells or sets of separated shade elements are provided and a space or fraction of a cell or set is eliminated.

The forming of a front and back shade element into oppositely configured shapes provides inherent or self-compensating means for expansion and contraction of the screen members. It will be recognized that in some climates temperature differentials may vary between a few degrees to more than fifty degrees in the course of a 24-hour period and the configuration or curvature of the shade elements automatically compensates for expansion and contraction of the screen members. Such compensating means obviously facilitates and simplifies the attachment of panel units to support means.

It will be readily apparent from a consideration of FIG. 1 that the screen wall 20 is spaced a sufficient distance from the exterior building wall so that ample room is provided for persons required to work on the outside of the building wall, as for example, window washers.

It will also be apparent that the location of such a screen wall in front of a building wall not only blocks the sun's rays but will also tend to disperse a stream of water which may be directed thereagainst during the fighting of a fire in the building with which the screen wall is associated. As described above, each screen member is of thin section and is mounted in the side frame members by means of oppositely bent portions of a split end projection on the screen member. In the event of fire and the need for directly striking the wall or window opening with a stream of water, a fireman may readily hook the screen member with his fire pike and by exerting a sharp forceful pull on the screen member the screen member will become disassembled from its mounting on the side frame members. An opening through the screen wall at desired locations may thus be readily made. At certain angles a stream of water from a hose may be directed between tilted screen members to a fire area.

It will also be understood by those skilled in the art that while the angle of tilt or inclination of the screen members is selected to fully block the sun's rays to a selected profile angle, such inclination of the screen members presents outwardly inclined top surfaces which are virtually self-cleaning. Rain tends to wash said top and forwardly directed surfaces clean and water thereon from the concave top surface of the back separated portion may fall between the separated portions 48a, 48b and through the gap G. When it is desired to clean surfaces of the screen wall a stream of water from a hose may be directed against the same in order to remove particles of foreign matter which may have been deposited upon the structure over relatively long periods of time. It will be apparent that the present construction requires only a minimum of maintenance.

While the inclination of the blades provides such a self-cleaning feature which limits and reduces to a minimum the collection of foreign matter thereon and thereby tends to reduce conditions which may cause or make more rapid corrosion of the screen members, such inclination also provides bottom rearwardly facing surfaces on the screen members which are subject to observation by persons in the building. Since only the bottom surfaces are viewed by a person standing near a window opening, such surfaces will virtually always present a clean, unmarred appearance.

It will be understood, of course, that metal sun screen wall constructions may be anodized, porcelainized, painted or provided with other decorative protective coatings or finishes in order to enhance the appearance of the screen wall and to harmonize the screen wall with the remainder of the building structure.

While the screen wall 20 has been described with respect to its association with an exterior building wall it will be understood that the screen wall may be used for other screening purposes, as for example, about a patio, swimming pool or other areas where some privacy may be desired. In its use as a screen wall, for such purposes it is apparent that the construction of screen wall 20 not only provides substantial blocking of visibility from front to back while permitting more than 50% visibility from back to front, but also provides ventilating means whereby a breeze or other movement of air may be diffused.

It will be understood, of course, that while the invention has been described with the screen members arranged in horizontal rows for its main purpose of fully blocking the sun's rays, if such complete blocking is not desired under certain conditions, the screen wall may be turned 90° so that the rows are vertically arranged in order to produce certain desired aesthetic and artistic effects.

While the present invention has been described in relation to an exterior sun screen wall construction, the wall construction may be utilized as a ceiling structure and more particularly may be employed as a skylight or in spaced relation to a glazed skylight area. In such installations it will be apparent that the screen wall is employed to achieve diffusion of light and ventilation while at the same time providing desired shade characteristics for the area protected by the screen wall.

It will also be understood that the present invention contemplates a screen wall construction wherein a narrow vertical wall zone is provided with a plurality of shade elements arranged in rows and one or more vertical wall zone may be employed behind said first wall zone, each provided with a plurality of shade elements arranged in rows which coact and cooperate with the shade elements of the wall zone in front thereof so as to produce full shade while at the same time producing maximum visibility therethrough.

It will be understood by those skilled in the art that various modifications and changes may be made in the screen wall construction described above and that such modifications may come within the spirit of this invention, and all such changes coming within the scope of the appended claims are embraced thereby.

I claim:

1. A light-weight sun control screen wall construction affording full shade from the sun to a selected angle with respect to horizontal and affording maximum visibility from interior to exterior through said construction, comprising:

(a) a plurality of individual elongated screen members mounted in a vertical series of parallel horizontal rows, (b) said individual elongated members being of uniform width and having means for mounting said members in uniform spaced relation with their front and back edges aligned in parallel vertical planes, said members having main surfaces inclined relative to said vertical planes, (c) each individual elongated member including at least two longitudinally extending, separated, pre-formed portions, (d) the pre-formed portions of each individual elongated member being in spaced relation with respect to the corresponding portions of each adjacent individual elongated member, (e) the said separated pre-formed portions of each individual elongated member being symmetrical with respect to a lateral neutral plane and with respect to a plane normal to said lateral plane.

2. A screen wall construction as stated in claim 1 wherein each pre-formed portion is arcuate and curved about an axis which is perpendicular to the longitudinal axis of said individual elongated screen member.

3. A construction as stated in claim 1 wherein each pre-formed portion includes a planar section extending in the same direction as said lateral neutral plane.

4. A construction as stated in claim 1 wherein each screen member has end portions interconnecting said separated pre-formed portions.

5. A solar control screen wall construction adapted to completely block passage of direct light from a front side to a back side of said wall construction and through a predetermined range of angular relation of sunlight to said wall construction, while providing maximum horizontal visibility from said back side through said wall construction to said front side, comprising:

(a) a plurality of individual elongated screen members mounted in a vertical series of parallel horizontal rows, (b) each individual elongated screen member including a plurality of longitudinally spaced sets of front and back screen elements, (c) each set of front and back screen elements in each individual elongated screen member being pre-formed with respect to a lateral neutral plane of said screen member and also with respect to a plane normal to said lateral neutral plane, (d) each set of front and back screen elements being spaced apart from the corresponding adjacent sets of front and back screen elements in the vertical series of adjacent individual elongated screen members, (e) the front element of one set of front and back screen elements co-acting with the back element of an adjacent set of front and back screen elements in the vertical series so as to block light in accordance with the angle of inclination of said lateral neutral plane to the wall, with the spacing of said sets of front and back screen elements, and with the width of said individual elongated screen members, and (f) means for supporting said plurality of individual elongated screen members.

6. A sun screen wall construction adapted to provide maximum shade and maximum visibility therethrough from interior to exterior comprising:

(a) a support means;

(b) means on said support means for blocking the sun's rays directed against said wall construction including (c) inclined front and back shade elements spaced from front to rear with respect to the direction of the sun's rays to be blocked, (d) said front elements being spaced apart in a vertical series of parallel rows, (e) said back elements being spaced apart in a vertical series of parallel rows correlated to the vertical series of the front elements, (f) the front shade elements serving to block rays at angles of selected degree to the horizontal, the back shade elements serving to block rays at angles of less degree to the horizontal.

7. In a solar energy control structure for use at the exterior of a building for providing full shade above a selected light ray angle with respect to the horizontal comprising:

(a) sun control means including (b) a plurality of elongated shade and light ray reflecting front elements mounted in a vertical series of parallel horizontal rows and (c) each front element having forward and rear edges in spaced relation to forward and rear edges of adjacent front elements, (d) a plurality of elongated shade and light ray reflecting back elements mounted in a vertical series of parallel horizontal rows correlated to the rows of the front elements and (e) each back element having forward and rear edges in spaced relation to forward and rear edges of adjacent back elements, (f) said front and back elements being inclined with respect to the horizontal whereby the spacing of said front elements with respect to each other and the spacing of said back elements with respect to each other and to the front elements provides that a light ray path extending between the forward edge of a front element and the rear edge of an adjacent back element in the next lower row defines a selected light ray angle with respect to the horizontal above which light rays are reflected from said front and back elements to block direct passage of light rays through said control means and to diffuse those light rays not reflected exteriorly of the control means.

8. In a solar energy control structure as stated in claim 7 wherein said front elements are convexly curved with respect to the direction of light rays and said back elements are concavely curved with respect to the direction of said light rays.

9. A solar energy control structure as stated in claim 7 including means interconnecting said front and back elements for holding said elements in spaced relation.

References Cited in the file of this patent

UNITED STATES PATENTS

| | | |
|---|---|---|
| 2,305,918 | Belsky | Dec. 22, 1942 |
| 2,327,703 | Freden | Aug. 24, 1943 |
| 2,492,909 | Warp | Dec. 27, 1949 |

FOREIGN PATENTS

| | | |
|---|---|---|
| 679,707 | Great Britain | Sept. 24, 1952 |